Nov. 26, 1968 N. L. STAUFFER 3,413,411

FACSIMILE TRANSMISSION WITH GALVANOMETER SCANNING AND MODULATION

Filed Feb. 8, 1965 2 Sheets-Sheet 1

INVENTOR
NORMAN L. STAUFFER

BY Arthur H. Swanson
ATTORNEY

Nov. 26, 1968 N. L. STAUFFER 3,413,411

FACSIMILE TRANSMISSION WITH GALVANOMETER SCANNING AND MODULATION

Filed Feb. 8, 1965 2 Sheets-Sheet 2

INVENTOR
NORMAN L. STAUFFER

BY Arthur H. Swanson

ATTORNEY

United States Patent Office 3,413,411
Patented Nov. 26, 1968

3,413,411
FACSIMILE TRANSMISSION WITH GALVANOMETER SCANNING AND MODULATION
Norman L. Stauffer, Englewood, Colo., assignor to Honeywell Inc., Minneapolis, Minn., a corporation of Delaware
Filed Feb. 8, 1965, Ser. No. 430,811
3 Claims. (Cl. 178—6)

ABSTRACT OF THE DISCLOSURE

A facsimile recording system is arranged with a transmitting and a receiving station. The transmitting station includes a galvanometer for scanning a document to be copied at a uniform rate and reflecting the image formed thereby upon a photoelectric cell. The resulting signal is applied to a first galvanometer within the receiving station. The first galvanometer reflects a light beam, formed from a light source, upon a mirror and then toward a second galvanometer. The second galvanometer is synchronized with the scanning galvanometer in the transmitting station for sweeping a light sensitive recording medium at the same uniform rate. A light area on the document causes the photoelectric cell to produce a signal which displaces the first galvanometer for reducing the amount of light reflected upon the recording medium by the second galvanometer and, thereby, creating a light area thereon.

This invention relates to recording apparatus, and more particularly to a facsimile telemetering system.

It is an object of the present invention to provide an improved facsimile recording apparatus using a galvanometric scanning technique for reading and printing of copy material.

It is another object of the present invention to provide an improved facsimile recording system of the type set forth wherein a light beam is modulated in accordance with received information and caused to scan the recording surface.

It is a further object of the present invention to provide an improved facsimile recording apparatus which accomplishes a high speed operation and avoids the necessity of modulating the intensity of radiation at the recording source or the use of low speed, high inertia variable density movable filters.

It is still a further object of the present invention to provide an improved facsimile telemetering system, as set forth herein, having a simple operation and construction.

In accomplishing these and other objects, there has been provided, in accordance with the present invention a facsimile system having an intensity modulated scanning light-beam recorder wherein the modulation and the scanning are accomplished by means of a pair of high speed galvanometric deflecting mirrors and a fixed mirror. Light from a high intensity source is focused upon a first deflecting galvanometer mirror with the modulating signal being applied to that galvanometer. The light reflected from the first galvanometer mirror is then reflected from a fixed mirror toward a second galvanometer mirror. The second galvanometer has applied thereto a uniform scanning signal. The amount of light falling on the second galvanometer mirror is determined by the deflection of the first galvanometer mirror. The light reflected by the second galvanometer is caused to scan transversely a uniformly advancing light sensitive record receiving member. At the transmitter, a record to be copied is driven at a uniform rate to pass an illuminated scanning position. A galvanometer mirror, driven by a uniform scanning signal, scans the material, line-by-line, and forms an image on a photo tube. The output signal from the photo tube is, in turn, applied to the first galvanometer as the modulating signal.

A better understanding of the present invention may be had from the following detailed description when considered in connection with the accompanying drawings, in which.

Figure 1:
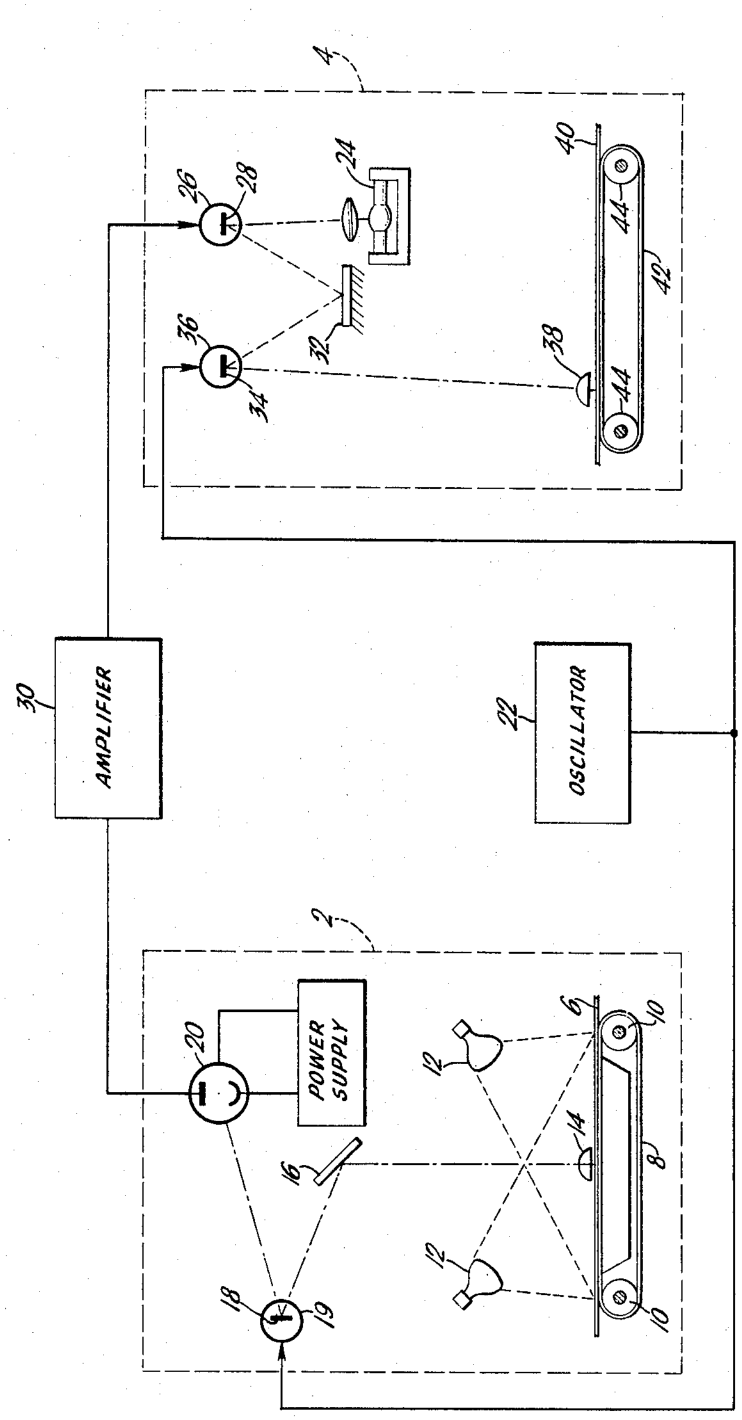
FIG. 1 is a schematic representation of a recording system embodying the invention.

Referring now to the drawings in more detail, there is shown in FIG. 1 a representation of a complete system in the manner of a facsimile recorder. The system includes a grading station 2 and a recording or reproducing station 4, which may be remotely located from the reading station 2. The reading station 2 includes a sheet member 6 bearing recorded material to be optically sensed, and drive means for advancing the sheet member 6 at a uniform rate through the instrument. This last drive means may include an endless conveyer 8 supported on and driven by a pair of rollers 10, one of which may be driven by a suitable power source (not shown). The surface of the sheet 6 is illuminated by a suitable light source such as the lamps 12. A cylindrical lens 14 is positioned adjacent the path of movement of the member 6 to define a transverse scanning path and to effect a focussing of a part of the copy material to be sensed; i.e., the part of the scanning path. A fixed mirror 16 is positioned relative to the lens 14 to reflect an image of the scanned transverse line on the member 6 onto the mirror 18 of an oscillographic galvanometer 19. The galvanometer mirror 18 reflects the image of the scanned line portion of the copy member 6 onto a suitable photosensitive detector represented by the photocell 20.

The galvanometer structure 19 including the mirror 18 may be of the type shown in Heiland et al. Patent No. 2,908,866. The mirror 18, itself, is very small and light, and is therefore capable of a very high speed scanning operation. A mirror driving signal is applied to the galvanometer 19 from an oscillator 22. The oscillator 22 may be any suitable type capable of driving the galvanometer mirror at a desired high scanning frequency and to cause a uniform full-scale deflection of the galvanometer mirror for each scan cycle 18. Full-scale deflection of the galvanometer mirror, as used herein, means that angular deflection of the galvanometer mirror which will cause an effective scan of the record member over the full width of the working area thereof. At any instant the galvanometer mirror 18 "looks at" a tiny incremental area of the surface of the copy member 6 and reflects the illumination from that incremental area onto the photosensitive detector 20.

If the surface of the member 6 is uniformly illuminated by lamps 12, the intensity of the illumination, representative of that incremental area, reflected onto the photosensitive detector 20 is a function of the reflecting condition of the surface of the member 6 at that incremental area. Accordingly, the electrical signal developed by means of the detector 20 at any instant is a function of the relative lightness or darkness of the corresponding scanned incremental area of the surface of the member 6. As the mirror 18 is caused to oscillate at relatively high frequency, it "looks at" a succession of such incremental areas forming a scanned line on the surface of the member 6, which succession of areas may vary in reflectance in accordance with information imprinted thereon. As the mirror 18 scans this succession of incremental areas, the electrical signal developed by the detector 20 varies correspondingly. The uniform oscillatory movement of the mirror 18 produces a repetitive transverse scan of the copy member 6. As the member 6 is advanced through the reading station, as by means of the belt 8, each successive transverse scan by the mirror 18 will be slightly displaced relative to the preceding one, effectively producing a longitudinal scan of member 6.

The result of the operation thus far described is to produce a series of electrical signals representative of the pattern of the light and dark areas of the surface of the member 6. For simplicity of reference herein, these signals will be referred to as image signals. The recording or reproducing station 4 includes means for utilizing such image signals to provide a replica of the member 6. These image signals are telemetered by any suitable means to the recording station 4.

At the recording or reproducing station 4, there is provided a suitable source of high intensity recording light represented by the ultra-violet lamp 24. A first galvanometer 26 having a mirror 28 is positioned to receive a concentrated beam of light from the source 24. The galvanometer 26 is energized by the transmitted image signals from the detector 20 after having been amplified by an interconnected amplifier 30. The light from the source 24 is reflected by the galvanometer mirror 28 onto a fixed mirror 32. From the fixed mirror 32, the light is reflected toward the mirror 34 of a second galvanometer 36. The galvanometer 36 is driven in a uniform cyclic operation in synchronization with the galvanometer 19 of the reading station 2. This may be accomplished, as illustrated, by driving both galvanometer 19 and 36 from the same oscillatory source 22. Light reflected from the galvanometer mirror 34 is directed, through a suitable focussing lens 38, to the surface of a light sensitive record member 40. Means are provided for advancing the member 40 past the lens 38 at a uniform rate. In FIG. 1, the advancing means is illustrated as a simple endless belt 42 and drive rollers 44. This last mentioned means would, preferably, drive the record member 40 at a linear speed which is the same as or at least constantly proportional to the speed of advancement of the copy member 6 at the transmitting station 2. Similarly, as mentioned, the lateral sweep of the beam across the width of the member 40, under the control of the galvanometer mirror 34, is related to the sweep of the scanning trace at the transmitting station.

With this arrangement, the image signals from the detector 20 are amplified by the amplifier 30, and applied to energize the galvanometer 26. The energization of galvanometer 26 causes its mirror 28 to be deflected from its normal or unenergized position by an amount which is proportional to the magnitude of the applied signal. Since the image signal, amplified by the amplifier 30 and applied to the galvanometer 26, is proportional to the relative brightness of the incremental area "seen" by the detector 20, the deflection of the mirror 28 from its normal unenergized position will be proportional to the brightness of the incremental area "seen" by the detector 20. The arrangement of the several components constituting the recording station 4 and the orientation of those components is such that, when the galvanometer 26 is not energized light from the source member 24 falls upon the undeflected mirror 28 of the galvanometer 26. The beam reflected from the undeflected mirror 28 falls upon the fixed mirror 32 and is, from there, reflected to fill the mirror 34 of the galvanometer 36. As the galvanometer 26 is energized and the mirror 28 accordingly deflected, the beam of light reflected from the mirror 28 is shifted in the direction of the deflection of the mirror 28. By this operation, a smaller portion of the beam would fall on the mirror 34, thereby reducing the intensity of the light beam reflected by the mirror 34 toward the photosensitive record member 40.

The photosensitive record member 40 is such that the darkness of the resultant trace thereon is directly proportional to the intensity of the light beam falling thereon. Thus, under the influence of the image signal from the transmitting station 2 to the galvanometer 26 may be actuated to vary the illumination falling upon the record member 40 from a maximum when the reflected beam fills the mirror 34 to zero illumination when the deflection of the galvanometer mirror 28 causes the reflected beam to be completely displaced off the mirror 34 of the galvanometer 36. In the system thus described, it will be seen that the intensity of the light beam falling on the record member 40 will be continuously modulated by the action of the galvanometer 26 in response to the image signals applied thereto from the amplifier 30. The oscillatory drive of the galvanometer 36 causes this modulated light beam to sweep back and forth transversely across the record member 40 as the member 40 itself is advanced at a uniform rate past the recording position. With this combination of effects, there will be produced on the record member 40 a sequential light pattern forming an image which is a replica of the image on the record member 6 in the transmitting station 2. Such a facsimile telemetering system has an adaptibility to a confidential information transmitting apparatus since at the recording station 4, the linear speed of the record member 40 and the oscillatory drive for scanning galvanometer 36 must be synchronized with the corresponding elements of transmitting station 6 in order to produce an accurate reproduction of the transmitted material.

In FIG. 1 the several components in the reproducing or recording station 4 are merely schematically represented to illustrate the principle involved. The orientation and positioning of the several components is not taken into consideration. This physical structure may be in any suitable configuration which includes a physical embodiment of the present invention. The physical structure may be a modification of that illustrated in the U.S. Patent 3,143,388 issued on Aug. 4, 1964 to John P. Mahoney and R. S. Kampf, and entitled, "Recording Apparatus." The instrument illustrated in that patent corresponds to a portion of the structure shown in FIG. 1 which is generally identified as a recording or reproducing station 4. The recording medium or light sensitive member 40 may be of the type shown in the U.S. patent of R. S. Kampf, 3,066,299, issued on Nov. 27, 1962.

Figure 2:
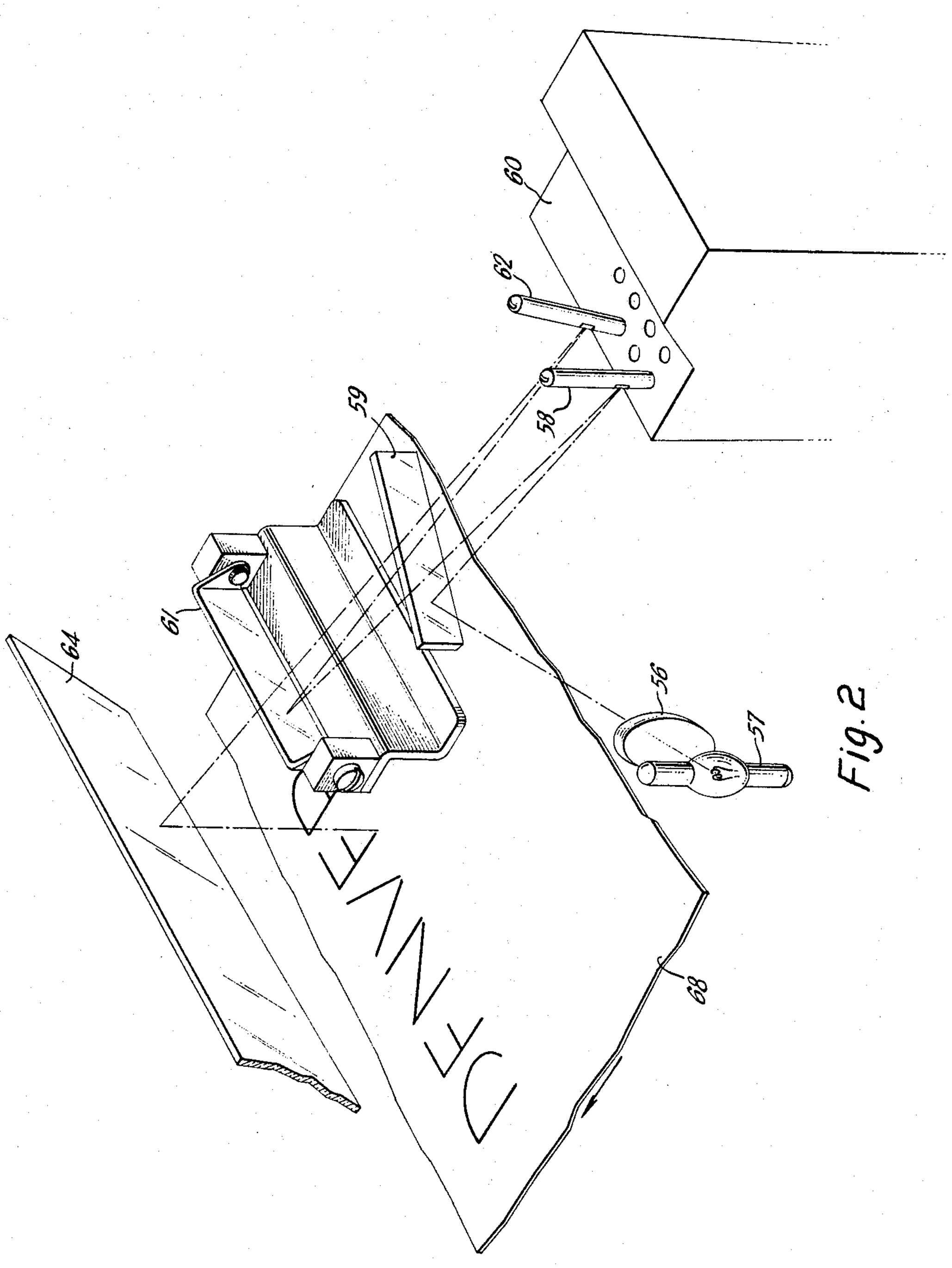
FIG. 2 is a fragmentary perspective view illustrating a recorder embodying the invention.

As shown in the partial pictorial view of FIG. 2, the actual physical structure may include a condensing lens 56 mounted in a suitable housing which lens is positioned adjacent to a light source lamp 57 for focussing a beam of light eminating from the source 57 onto the mirror of a first galvanometer 58. This beam of light may be directed to the galvanometer 58 in either a direct path from the light source 57 or by means of a mirror 59 to provide a more compact light path. The galvanometer 58 may be mounted in a holding fixture 60 for proper alignment with the rest of the recording elements. The mirror of the galvanometer 58 reflects the light beam onto an adjustable mirror 61. From the fixed mirror 61, the light beam is reflected onto the mirror of the second galvanometer 62. The light beam is then reflected from the mirror of the second galvanometer 62 to a second fixed mirror 64 which is mounted at such an angle as to direct the beam onto the surface of a light sensitive record medium 68. A condensing lens may be provided between the mirror 64 and the medium 68 to focus the recording beam.

Accordingly, it may be seen that there has been provided, in accordance with the present invention, a facsimile transmitting and receiving system using oscillographic techniques having high-speed galvanometer movements for scanning information to be copied and a copy recording medium.

What is claimed is:

1. A facsimile recording system comprising an oscillographic transmitting station having an oscillographic scanning means operative to sequentially scan incremental areas of recorded information to be copied to produce a light beam having an intensity corresponding to said incremental areas, light sensitive means arranged to respond to the intensity of said light beam from said scanning means to produce a corresponding electrical signal, a receiving station having receiving means arranged to receive said electrical signal from said light sensitive means, a first oscillographic means connected to said receiving means to produce a light beam having a direction corresponding to said electrical signal, a photosensitive recording medium, a second oscillographic means arranged to receive a variable portion of said light beam from said first oscillographic means and to direct said received portion of said light beam to said recording medium, driving means arranged to drive said scanning means and said secondoscillographic means at the same scanning speed, and first means for driving said information to be copied past said oscillographic scanning means, second means for driving said recording medium past said second oscillographic means, and synchronizing means, arranged to coordinate the operation of said second means for driving with said first means for driving, whereby to produce a replica of said recorded information.

2. A facsimile transmitting and receiving system comprising an oscillographic transmitting station having a galvanometer movement, a mirror mounted on said movement, first oscillatory energizing means connected to said movement to produce an oscillation thereof, driving means arranged to drive information to be copied past said mirror to effect a transverse scan of successive longitudinal lines of said information by said oscillation of said movement and said mirror, illuminating means arranged to illuminate said information to produce a light beam directed to said mirror from incremental sequential areas of said information, light sensitive means arranged to intercept a reflected light beam from said mirror and to produce a corresponding electrical signal, transmitting means connected to said light sensitive means to transmit said electrical signal, an oscillographic receiving means having a first galvanometer movement, a first mirror attached thereto, a signal receiving means arranged to apply said electrical signal from said transmitting means to said first movement, a light source arranged to produce a beam of light directed to said first mirror, a second galvanometer movement, a second mirror attached to said second movement and arranged to intercept a portion of a reflected light beam from said first mirror, second oscillatory energizing means connected to said second movement and arranged to produce an oscillation thereof, a recording medium and, drive means for said recording medium arranged to drive said medium past said second mirror to intercept a reflected beam of light from said second mirror on successive transverse incremental areas to effect a transverse scan of successive longitudinal lines of said medium.

3. A facsimile transmitting and receiving system as set forth in claim 2 which includes synchronizing means arranged to coordinate the operation of said first and said second oscillatory energizing means.

References Cited

UNITED STATES PATENTS 1,768,634 7/1930 Robb ---------------- 178—6

ROBERT L. GRIFFIN, *Primary Examiner.*

H. W. BRITTON, *Assistant Examiner.*